Patented July 31, 1928.

1,678,648

UNITED STATES PATENT OFFICE.

HARRY H. REPLOGLE, OF UPPER MONTCLAIR, NEW JERSEY, ASSIGNOR OF ONE-HALF TO JOHN YOUNG, OF CALDWELL, NEW JERSEY.

EDIBLE-DYE COMPOSITION.

No Drawing.    Application filed January 8, 1923. Serial No. 611,514.

This invention relates to the application of colors and dyes and more particularly to the form in which they are applied.

An object of the invention is the provision of a coloring composition that may be directly used or applied for impregnating or coloring various substances or materials.

Another object of the invention is the provision of a solvent for certain types of dyes or colors which is miscible with water and also with other substances of its own or related class or classes.

Another object is the provision of a solvent having the property of being able to dissolve a large quantity of a color or dye so as to form therewith a color composition of matter, the soluble ingredient of which may be varied to suit conditions of taste or fancy.

Another object of the invention is the provision of a solvent for food colors, and the like, capable of forming therewith clear and complete solutions having such purity as to permit the use of said solutions in edibles.

A further object of the invention is the provision of a solvent for food colors, and the like, which leaves said colors free from toxic effects, inhibits fermentation and growth of bacteria.

A still further and more specific object is the provision of a color or dye solvent which may be employed as a substitute for ethyl alcohol.

I have found that dihydric alcohols, and more particularly ethylene glycol, are excellent solvents for certain types of dyes and colors. Ethylene glycol has the capacity or ability of dissolving a very large quantity of a dry color or dye, such as is used for coloring textiles, food stuffs, beverages, pharmaceuticals, etc., for either commercial or household purposes. Because of this property, very concentrated solutions in which ethylene glycol is the solvent can be made, thus affording ready and easy use or application of a coloring material or dye to the art to which it appertains.

The miscibility of ethylene glycol with water and practically all other liquids or substances with which it may become associated when used as a color solvent, insures the homogeneity of the finished product. In fact, it is this property which lends great value to the use of ethylene glycol as a vehicle or medium to color or dye other substances.

Another favorable property of ethylene glycol when used as a color solvent, is that the resulting solution is non-toxic, yet has many of the medicinal or chemical properties of ethyl alcohol such as being capable of prohibiting or retarding fermentation, growth of bacteria, etc., and is also a coloring solvent superior to alcohol in many respects.

Although the invention is not limited to the application of a color to food stuffs, I will describe generally its use in this connection. In practicing the invention I prefer to dissolve a dry organic coloring material which is edible in ethylene glycol, either with or without the application of heat. Since ethylene glycol has the capacity of dissolving considerable quantities, relative to its own weight, of a color in powder or granular form, the properties of the resulting solution may be varied over a wide range, such properties being the strength of the solution, the viscosity thereof, etc. It is therefore possible to make either concentrated or weak coloring compositions by using ethylene glycol as the solvent of the coloring material, the use to which the solution is to be put being the determining factor as to the color strength thereof.

As a concrete illustration of carrying out my invention the following formula may be used to produce a satisfactory solution to impart a deep shade to liquids or plastic bodies; seven pounds of dry color is dissolved in one gallon of ethylene glycol, the mixture being preferably heated to a temperature of 150° F. to 180° F. and stirred until a complete solution is obtained. The viscosity of the resulting solution is comparable to that of a jelly and it may be added with stirring directly to the liquids or plastic bodies to the extent desired.

The foregoing formula may be expressed in percentages if preferred. As the specific gravity of ethylene glycol is 1.116, a gallon thereof weighs approximately 9.3 pounds, and since the quantity of color used may be as much as 7 pounds to a gallon of glycol the ratio or percentage by weight of coloring material to the solvent vehicle is about 75%. It is obvious that this proportion of color may be varied downwardly or reduced to an insignificant quantity with a corresponding increase in the amount of glycol used.

As examples of coloring matters suitable for use with the solvents I contemplate and in the proportions specified may be cited Amaranth 107, Tartrazine 94, Orange I 85, Sodium Indigo Di-sulfonate 692, Ponceau 3 R 56, Guinea Green B 433, Light Green S. F. Yellowish 485. (The foregoing are Schultz and Julius numbers.)

If the batch is of other than a standard quantity for a given amount of the color solution, the addition of the latter may be accurately controlled because its viscosity is such that the dispensation of the solution can be closely regulated, as, for instance, added drop by drop in order to secure the desired tint. For like reasons, delicate tints may be obtained in coloring a standard batch a given shade by varying the specified amount of the solution made by following the above formula.

As previously stated, the strength of a given color solution may be varied over a wide range, but for general household purposes it is preferable not to have it of a concentrated nature because a small variation in the quantity employed will materially affect the resulting shade of color obtained.

In the event it is preferred to apply the coloring composition in the form of a paste, the same may be done by adding thereto materials or substances such as cane sugar, milk sugar, glucose, dextrine, starch, or the like. A paste thus formed is readily liquefiable when introduced into a liquid product desired to be colored.

Although considerable stress has been laid upon the use of ethylene glycol as a color or dye solvent, it is to be appreciated that I contemplate the preparation of coloring compositions by the use of glycols generally, i. e., either ethylene glycol, propylene glycols, or mixtures thereof, either with or without water. I also contemplate the use of these substances as a solvent with admixtures of other solvents and desire to cover broadly the idea of employing dihydric alcohols as solvents for color and dye materials when used either separately or in combination with each other in their various forms in which they exist or in conjunction with other solvents.

I am aware that ethylene glycol has heretofore been proposed as a solvent for a flavoring material in the manufacture of flavoring extracts, but its use as a solvent for a color or dye is believed to be novel with me. The use of this substance as a solvent in these branches of the art is not obvious because the adaptability thereto cannot be predicted as being based upon any properties it may possess. Furthermore, since most colors and dyes are synthetic products the problem of obtaining a solvent therefor is materially complicated.

While I have described my invention with particular reference to using ethylene glycol in the manufacture of color compositions, it may be employed with equal success in using any of the dihydric alcohols in forming either color or dye solutions, and I desire to cover all such compositions as coming within the scope of the appended claims. In the claims, although I have used the terms "coloring composition" and "colors," I do so broadly and wish to include thereby either a color or a dye material.

What is claimed is:

1. A coloring composition which comprises an edible organic coloring material dissolved in a dihydric alcohol.

2. A coloring composition which comprises an edible organic coloring material dissolved in ethylene glycol.

3. A method for coloring a food product which comprises admixing said food product with a coloring composition consisting of an edible organic coloring material dissolved in ethylene glycol.

In testimony whereof, I have hereunto subscribed my name this 30th day of December, 1922.

HARRY H. REPLOGLE.